United States Patent
D'Anna

(10) Patent No.: US 11,197,462 B2
(45) Date of Patent: Dec. 14, 2021

(54) ANTI-MARKING PAD

(71) Applicant: Andrea M. D'Anna, Rescue, CA (US)

(72) Inventor: Andrea M. D'Anna, Rescue, CA (US)

(*) Notice: Subject to any disclaimer, the term of this patent is extended or adjusted under 35 U.S.C. 154(b) by 80 days.

(21) Appl. No.: 16/239,429

(22) Filed: Jan. 3, 2019

(65) Prior Publication Data

US 2020/0214261 A1 Jul. 9, 2020

(51) Int. Cl.
| | | |
|---|---|---|
| *A01K 23/00* | (2006.01) | |
| *A01K 27/00* | (2006.01) | |
| *A01K 15/02* | (2006.01) | |
| *A01K 1/01* | (2006.01) | |

(52) U.S. Cl.
CPC .......... *A01K 27/008* (2013.01); *A01K 1/0107* (2013.01); *A01K 15/02* (2013.01); *A01K 27/001* (2013.01); *A01K 23/00* (2013.01)

(58) Field of Classification Search
CPC ...... A01K 23/00; A01K 13/006; A01K 15/02; A01K 1/035; A01K 21/00; A01K 27/007; A01K 27/008; A01K 29/00; A61F 2013/15186; A61L 2209/133; A61L 2209/15; A61L 9/014; A61L 9/12; A61L 15/00
USPC ....... 119/169, 867, 868, 869, 850, 712, 171; 604/385.14, 358, 397, 401, 402
See application file for complete search history.

(56) References Cited

U.S. PATENT DOCUMENTS

| | | | | |
|---|---|---|---|---|
| 4,577,591 A | * | 3/1986 | Wesseldine | A01K 23/00 119/850 |
| 5,005,525 A | * | 4/1991 | Stanton | A01K 23/00 119/838 |
| 5,234,421 A | * | 8/1993 | Lowman | A01K 23/00 119/869 |
| 6,142,105 A | * | 11/2000 | McKnight | A01K 23/00 119/850 |
| 6,234,117 B1 | * | 5/2001 | Spatt | A01K 13/006 119/850 |
| 6,334,408 B1 | * | 1/2002 | Cool | A01K 13/006 119/712 |
| 6,368,313 B1 | * | 4/2002 | Howard | A01K 23/00 119/850 |
| 6,557,497 B1 | * | 5/2003 | Milligan | A01K 23/00 119/850 |
| 6,860,239 B1 | * | 3/2005 | Begun | A01K 1/035 119/712 |
| 7,044,087 B1 | * | 5/2006 | Brecheen | A01K 21/00 119/838 |
| 7,464,668 B2 | * | 12/2008 | Brewington | A01K 23/00 119/850 |
| 7,670,324 B2 | * | 3/2010 | LaVon | A61F 13/42 604/385.14 |
| 8,302,565 B2 | * | 11/2012 | Williams | A01K 23/00 119/868 |

(Continued)

*Primary Examiner* — Yvonne R Abbott-Lewis
(74) *Attorney, Agent, or Firm* — David Millers

(57) ABSTRACT

An anti-marking system includes an absorber and a connector that removably attaches the absorber to an article, e.g., a collar, worn by the pet. The pet may be inhibited from marking by absorbing into the absorber the fluid or scent that the pet produces when the pet marks a location and then after absorbing the scent into the absorber, attaching the absorber to the article worn by the pet. In one implementation, the system includes a dog collar and an absorbent pad that is removably attached to the dog collar.

11 Claims, 2 Drawing Sheets

(56) References Cited

U.S. PATENT DOCUMENTS

| | | | | |
|---|---|---|---|---|
| 8,439,000 | B1* | 5/2013 | Mehtupciu-Ionescu | ..................... A01K 23/00 119/868 |
| 8,851,020 | B2* | 10/2014 | Pesale | ................... A01K 23/00 119/869 |
| 9,585,378 | B2* | 3/2017 | Smith | ................. A01M 31/008 |
| 2006/0289668 | A1* | 12/2006 | Szymczak | ................ A61L 9/12 239/36 |
| 2007/0012263 | A1* | 1/2007 | Hammonds | ............ A01K 23/00 119/850 |
| 2011/0126779 | A1* | 6/2011 | Walls | ..................... A01K 23/00 119/868 |
| 2012/0317863 | A1* | 12/2012 | Buck | ...................... A61L 9/042 43/2 |
| 2013/0116220 | A1* | 5/2013 | Marshall | ................ A61K 31/20 514/171 |
| 2019/0125916 | A1* | 5/2019 | Webster | .................... A61L 9/12 |
| 2019/0307104 | A1* | 10/2019 | Dragon | ................... A61F 13/49 |
| 2020/0253165 | A1* | 8/2020 | Luciew | ................. A01K 23/00 |

* cited by examiner

ANTI-MARKING PAD

BACKGROUND

Dogs and many other animals have a natural tendency to mark territory. Dogs, in particular, tend to urinate at multiple locations to mark their territory and thereby to build confidence and to feel more secure in their surroundings. While being a natural behavior, urine-marking is a problem particularly when dogs are kept indoors.

Sprays have been developed to prevent unwanted dog behaviors such as marking. One type of spray is use where or when a dog exhibits the unwanted behavior such as marking. The spray may annoy the dog, so that a dog that associates the behavior with the spray may avoid repeating the behavior in order to avoid the spray. Spray repellants and pheromones have also been developed in attempts to prevent marking or to keep dogs away from areas that dogs might otherwise mark. Currently available products that are intended to prevent dog marking behaviors have been ineffective or have been only marginally effective.

SUMMARY

In accordance with an aspect of the invention, an anti-marking system may include an absorber that may be attached to or worn by a dog or other pet. A dog anti-marking system may, for example, include a detachable and scent-absorbent pad that affixes to a collar worn by the dog. If a dog urine marks, the absorber may be applied to absorb some of the dog's urine. The absorber with the urine-scent can then be attached to the dog's collar. The absorber retains a scent of the marking that is specific to the individual dog, and for an extended period of time, the dog wearing the collar with the absorber will smell his or her own marking scent and will not feel the need to mark other areas.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Anti-marking systems and methods, particularly for pets such as dogs, employ a scent absorber that may be attached to an article worn by a dog or other pet. If a dog or other pet wearing the scent absorber marks a location, the scent absorber may be temporarily removed from the animal and applied in the marked location to absorb the scent of the marking. The absorber with the absorbed scent may then be worn by the animal for an extended period of time and may inhibit or prevent the animal's urge to mark further locations.

Figure 1A:
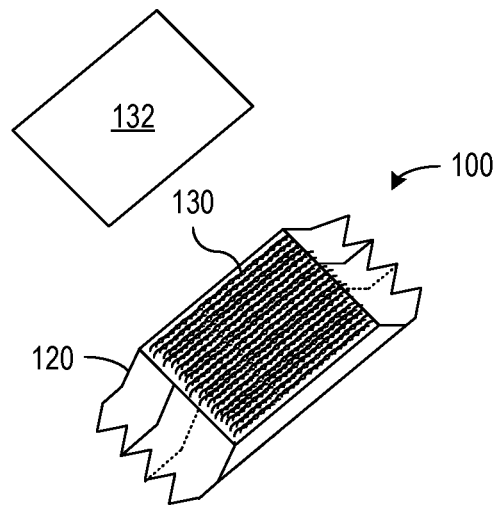
FIGS. 1A and 1B show perspective and exploded views of an anti-marking system in accordance with one implementation of the invention.
Figure 1B:
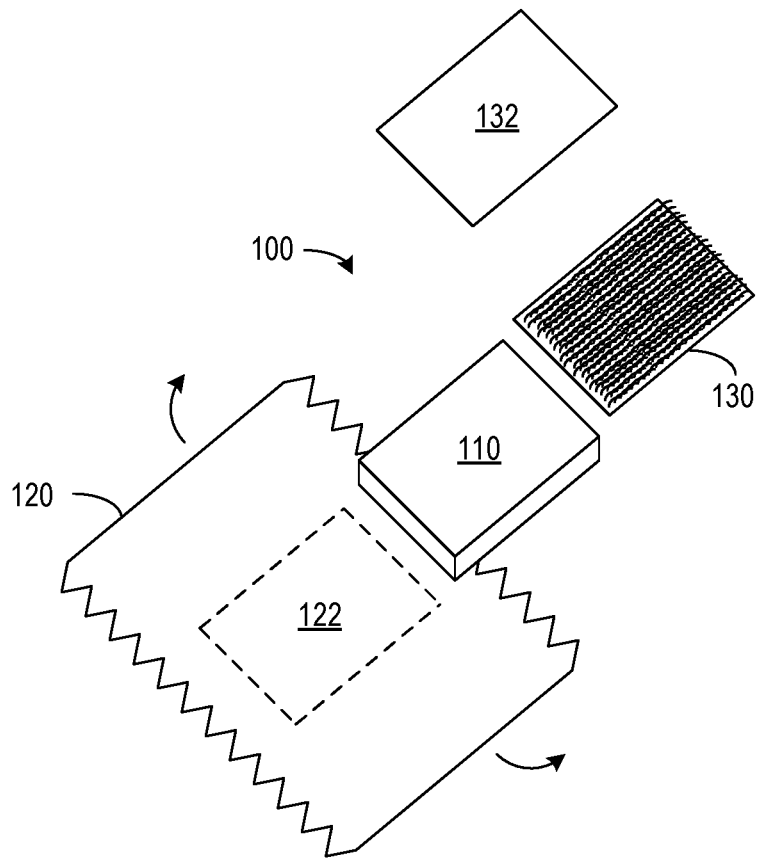

FIGS. 1A and 1B show perspective and exploded views of a system including an anti-marking pad 100 in accordance with one implementation of the invention. Anti-marking pad 100 includes an absorbent pad 110, a cover 120, and a connector 130 as shown in FIG. 1B.

Absorbent pad 110 may, for example, be a piece of sponge, cotton, synthetic filler, fabric, or other absorbent material. In an exemplary embodiment, anti-marking pad 100 is sized for attachment to an average dog collar, and absorbent pad 110 is a block of synthetic sponge about 1 to 2 cm wide, about 2 to 4 cm long, and about 1 cm or less thick. More generally, the size of absorbent pad 110 (and of anti-marking pad 100 as a whole) may be chosen according to the size of the article to which anti-marking pad 100 will be attached or according to the size of the dog or other animal that will wear the anti-marking pad. In particular, smaller anti-marking pads 100 may be for smaller pets, and larger anti-marking pads 100 may be for larger pets.

Cover 120 may be made of fabric or mesh that is cut and sized to wrap around and enclose absorbent pad 110. Cover 120 is shown flat in the exploded view of FIG. 1B, but when anti-marking pad 100 is fully assembled as shown in FIG. 1A, cover 120 may enclose and protect absorbent pad 110. In the exemplary embodiment, cover 120 wraps around absorbent pad 110 and has edges or ends that are glued or sewn together to entirely enclose absorbent pad 110. In particular, absorbent pad 110 may be placed on a central area of cover 120, and cover 120 may be wrapped around the sides and the top of absorbent pad 110. Once wrapped, the seam and both ends of cover 120 can be glued shut with a pet-friendly fabric glue, leaving the portion of cover 120 under the bottom of absorbent pad 110 free of glue that might otherwise inhibit absorption.

Cover 120 may be decorative or designed to be unobtrusive when attached to a matching collar or other article worn by a pet. FIGS. 1A and 1B show an implementation in which the ends of cover 120 have a zigzag shape that may be cut with pinking shears, but the ends of cover 120 may alternatively be any desired shape such as straight, curved, or mitered.

Cover 120 may be made of a material that is more durable or stain resistant than is the material used in absorbent pad 110. Cover 120 may be absorbent so that fluid from a marking can soak through cover 120 and absorb into absorbent pad 110. In an alternative implementation to the illustration of FIG. 1B, the functions of absorbent pad 110 and cover 120 may be combined in a single structure such as roll or multiple layers of folded material that is absorbent and durable. Alternatively, cover 120 may be less absorbent and less penetrable than absorbent pad 110, and cover 120 may include openings or holes through which urine or other marking fluid may pass through cover 120 into absorbent pad 110. An advantage of cover 120 being less penetrable than absorbent pad 110 is that an absorber including absorbent pad 110 with a less-penetrable cover 120 may be less messy to handle. Particularly, cover 120 may prevent dog urine from getting on a user's hands when handling the absorber.

Connector 130 may be permanently affixed to anti-marking pad 100, e.g., on the side where the seam of cover 110 is glued shut. Connector 120 is used to removably attach anti-marking pad 100 to a pet-worn article, e.g., a dog collar or pet clothing. In the exemplary embodiment, connector 130 is a part of a hook-and-loop fastener or touch fastener such as Velcro® that may be glued or sewn onto cover 120. A complementary connector 132 may be attached to the pet-worn article. For example, connector 130 may be a pad containing a field of hook or loops, and connector 132, which is affixed to the pet-worn article, may be a pad containing a complementary field of loops or hooks.

A scent absorber such as anti-marking pad 100 illustrated in FIGS. 1A and 1B may be thin and pad shaped to easily fit on a flat surface or a band such as a dog collar. Alternative implementations may employ other types of attachment devices such as a link or a ring (not shown) that may attach a scent absorber to hang from a dog collar in the same way that a dog tag hangs from a dog collar. In the alternative configurations, a scent absorber may have a shape other than a pad shape.

Figure 2A:
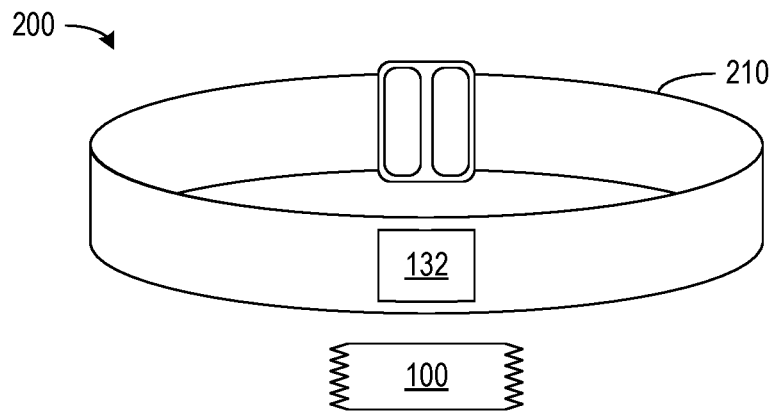
FIGS. 2A and 2B show an anti-marking system with a scent absorber respectively detached from and attached to a collar.
Figure 2B:
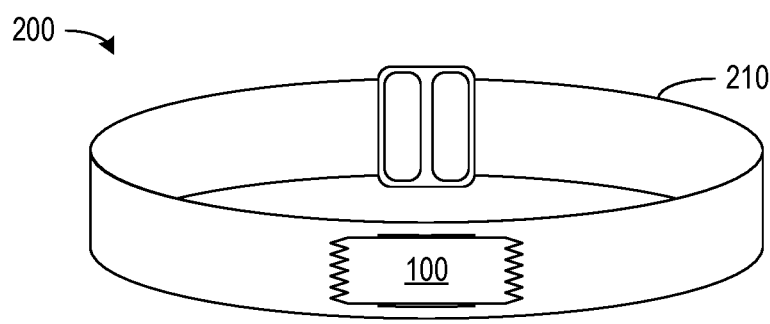

FIGS. 2A and 2B show an implementation of a dog anti-marking system 200 that includes an anti-marking pad 100 and a collar 210. Anti-marking pad 100 in FIG. 2A or 2B may be similar or identical to ant-marking pad 100 as described with reference to FIGS. 1A and 1B. Collar 210 may be of a conventional type worn by pets, e.g., a conventional dog collar, except that collar 210 further includes a connector 132, which is affixed to the band or belt area of collar 210. In the exemplary implementation, connector 132 may be one piece of a hook-and-loop fastener and may be sewn or glued on collar 210, and connector 130 on anti-marking pad 100 may be the other or a complementary piece of the hook-and-loop fastener. FIG. 2A shows anti-marking pad 100 detached from collar 210. FIG. 2B shows anti-marking pad 100 attached to collar 210. As shown in FIG. 2B, the width of anti-marking pad 100 may be about the same or smaller than the width of collar 210 so that anti-marking pad 100 does not interfere with normal wearing of collar 210. As mentioned above, anti-marking pad 100 may have a color or pattern that is decorative on collar 210 or that blends into the color or pattern of collar 210. Also, FIG. 2B shows an implementation in which connector 132 and anti-marking pad 100 are on the outside of collar 210. Alternatively, connector 132 may be inside collar 210, so that anti-marking pad 100 will be hidden under collar 210 when collar 210 is worn by a pet.

Other anti-marking systems may be similar to anti-marking system 200 of FIGS. 2A and 2B but may replace collar 210 with some other pet-worn article. For example, a harness, a leash, a dog sweater or other animal-worn apparel may include a connector such as connector 132 to which a scent absorber such as pad 100 may be removably attached.

In accordance with a further aspect of the present invention, a scent absorber such as anti-marking pad 100 may be inexpensive, removable, disposable, and replaceable. In particular, absorbers such as anti-marking pad 100 may be marketed separate from collar 210 or other animal-worn apparel and at a much low cost than the whole anti-marking system 200. Accordingly, anti-marking pad 100 in system 200 and similar anti-marking systems may be easily replaced if the original anti-marking pad 100 is damaged, becomes too soiled, loses a previously held scent, or will be worn by a different dog.

A method for using an anti-marking system such as disclosed herein may include obtaining one of the anti-marking systems described above. For example, a person keeping a dog may obtain a kit including an assembled anti-marking pad 100 and a connector 132 such as described with reference to FIGS. 1A and 1B. The dog keeper may then attach connector 132 to a collar or another dog-worn article that the keeper already has or that the keeper otherwise obtains for the dog. For example, connector 132 may be Vecro® tape that the keeper applies to the collar or other article. Alternatively, a dog keeper may obtain an anti-marking system such as system 200 shown in FIG. 2, which includes an anti-marking pad 100 and a collar 210 with a pad connector 132 already affixed. Regardless of how obtained, the dog may wear a collar or other article with a scent absorber, e.g., anti-marking pad 100, affixed during everyday activities. If the dog marks a location, the scent absorber may be removed from the collar or other article and applied to absorb urine or other marking fluid, and the scent absorber with the absorbed scent may be reattached to the collar. The dog can then continue to wear the collar or other article with the absorber attached. The dog will continue to smell the scent from the absorber, and the scent from the absorber may inhibit or eliminate the dog's urge to mark. The anti-marking system may thus eliminate marking behavior for an extended period.

The period of effectiveness of an absorbed scent may depend on the circumstances of use, e.g., the size and type of absorber, the weather, or the type, size, or activity of the dog. If an anti-marking pad 100 is suspected of losing effectiveness, the scent fluid may be reapplied to the same or a new anti-marking pad 100. In some cases, the effectiveness of the scent may be partly refreshed by moistening the anti-marking pad 100 with water.

Some implementations of the present invention have been disclosed with reference to dogs and particularly with reference to urine-marking behavior of dogs. It is understood, however, that the same or similar systems and methods may be used to prevent other types of pets or other animals from marking whether the marking is urine marking or other types of scent marking.

Although particular implementations have been disclosed, these implementations are only examples and should not be taken as limitations. Various adaptations and combinations of features of the implementations disclosed are within the scope of the following claims.

What is claimed is:

1. An anti-marking system comprising:
   a pad of an absorbent material that is absorbent of a liquid that a pet produces during a marking behavior;
   a connector on an area of the pad, the connector being configured to removably attach the pad on an exterior surface of an article worn by the pet; and
   a cover enclosing the pad, wherein the cover has opening that permit introduction of the liquid to the absorbent material, through the openings in the cover.

2. The system of claim 1, wherein the connector comprises a first piece of a hook-and-loop fastener, a second piece of the hook-and-loop fastener being on the exterior surface of the article worn by the pet.

3. The system of claim 1, wherein the cover comprises a fabric that is resistant to stains caused by the liquid.

4. The system of claim 1, wherein the article worn by the pet comprises a dog collar.

5. The system of claim 1, wherein the pet is a dog, and the pad absorbs of urine.

6. An anti-marking system, comprising:
   a dog collar;
   a first piece of a hook-and-loop fastener affixed to a surface of the dog collar;
   a pad comprising:
      an absorbent material that is absorbent of dog urine; and
      a cover enclosing the absorbent material and comprising openings that permit introduction of liquid to the absorbent material, through the opening in the cover; and:
   a second piece of the hook-and-loop fastener fixed to an area of the pad, the hook-and-loop fastener removably attaching the pad on the surface of the dog collar.

7. The system of claim 6, wherein the pad has a width no greater than a width of the dog collar.

8. The system of claim 6, wherein the cover comprises a material resistant to stains caused by the liquid.

9. A method for inhibiting marking by a pet, the method comprising:
- absorbing into an absorber a liquid that the pet produced when the pet marked a location; and
- after absorbing the liquid into the absorber, attaching the absorber to an article worn by the pet.

10. The method of claim 9, further comprising having the pet wear the article with the absorber attached before the pet marks the location, and removing the absorber from the article in order to absorb the liquid.

11. The method of claim 9, wherein the article worn by the pet comprises a collar.

\* \* \* \* \*